(12) United States Patent
Petrescu (10) Patent No.: US 7,704,022 B2
(45) Date of Patent: Apr. 27, 2010

(54) MOTORIZED PRECISION SPINDLE APPARATUS

(76) Inventor: Mircea Petrescu, 955 N. Talbot Rd., Windsor, Ontario (CA) N9G 1M8

( * ) Notice: Subject to any disclaimer, the term of this patent is extended or adjusted under 35 U.S.C. 154(b) by 866 days.

(21) Appl. No.: 10/555,255

(22) PCT Filed: Apr. 30, 2004

(86) PCT No.: PCT/US2004/013409

§ 371 (c)(1), (2), (4) Date: Aug. 3, 2006

(87) PCT Pub. No.: WO2004/098828

PCT Pub. Date: Nov. 18, 2004

(65) Prior Publication Data

US 2007/0154274 A1 Jul. 5, 2007

(51) Int. Cl.
*B23Q 3/12* (2006.01)
(52) U.S. Cl. ..................................... 409/231
(58) Field of Classification Search .......... 409/231–233
See application file for complete search history.

(56) References Cited

U.S. PATENT DOCUMENTS

| | | | | |
|---|---|---|---|---|
| 4,148,246 A | * | 4/1979 | Johnson et al. | 409/233 |
| 4,583,894 A | * | 4/1986 | Mitchell | 409/233 |
| 4,692,074 A | * | 9/1987 | Smith et al. | 409/233 |
| 4,957,398 A | * | 9/1990 | Schneider et al. | 409/136 |
| 5,033,922 A | * | 7/1991 | Watanabe et al. | 409/233 |
| 5,322,494 A | * | 6/1994 | Holtey et al. | 483/12 |
| 5,487,628 A | * | 1/1996 | Suzuki | 409/135 |

FOREIGN PATENT DOCUMENTS

| | | | | |
|---|---|---|---|---|
| JP | 61056846 A | * | 3/1986 | |
| JP | 02024009 A | * | 1/1990 | |
| JP | 11254213 A | * | 9/1999 | |

* cited by examiner

*Primary Examiner*—Daniel W Howell
(74) *Attorney, Agent, or Firm*—Reising Ethington P.C.

(57) ABSTRACT

A motorized precision spindle apparatus (10) including an outer cartridge spindle (12) supported on a motor cartridge spindle (14) and a motor-driven outer cartridge spindle shaft (16) supported for rotation on bearings (22) disposed between the shaft (16) and an outer spindle shaft housing (20). A tool holder (26) releasably holds a tool in position for rotation with the shaft (16). A draw-bar (30) is supported through the shaft (16) and the motor cartridge spindle (14) for reciprocal axial motion, is connected to the tool holder (26), and is biased in an axial direction that causes the tool holder (26) to grip a tool (28). An actuator (32) is connected to the draw-bar (30) and moves the draw-bar (30) in a direction opposite the bias, thereby releasing any tool the holder may be holding. An isolation tube (36) is supported within the motor cartridge spindle (14), is connected to the shaft (16), and supports the shaft (16) against transmitting axial forces to the bearings (22).

17 Claims, 5 Drawing Sheets

MOTORIZED PRECISION SPINDLE APPARATUS

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates generally to a motorized precision spindle apparatus for rotating and automatically exchanging tools in a flexible machining operation.

2. Description of the Related Art Including Information Disclosed Under 37 CFR 1.97 and 1.98

Motorized spindles for rotating and automatically exchanging machine tools are known in the art. For example, the Mazak Machining Center Model FH-680X manufactured by Yamazaki Mazak Corporation, discloses such an apparatus that includes an outer cartridge spindle and a separate motor cartridge spindle. The outer cartridge spindle is removably and interchangeably supported on the motor cartridge spindle. The outer cartridge spindle includes an outer cartridge spindle shaft supported for rotation about a spindle axis within a coaxial outer cartridge spindle shaft housing on outer cartridge spindle bearings. The outer cartridge spindle bearings are operatively connected between the outer cartridge spindle shaft and the outer cartridge spindle shaft housing. A spindle motor is supported in the motor cartridge spindle and includes a motor shaft drivingly and detachably connected to an inner end of the outer cartridge spindle shaft. The Mazak machining center also includes a tool holder supported in an outer end of the outer cartridge spindle shaft. The tool holder releasably holds a tool in position for rotation with the outer cartridge spindle shaft about the spindle axis. A draw-bar is coaxially supported for reciprocal axial motion through the outer cartridge spindle shaft and the motor shaft. An outer end of the draw-bar is operably connected to the tool holder and is spring biased in an axially inward direction away from the tool holder, which causes the tool holder to grip a tool. The Mazak machining center also includes a draw-bar actuator including a hydraulic cylinder supported axially adjacent the spindle motor and operably connected to an inner end of the draw-bar. The draw-bar actuator moves the draw-bar in a direction opposite the spring bias, which releases any tool the holder may be holding. The draw-bar includes an outer draw-bar section that is housed in the outer cartridge spindle shaft and is releasably connectable end-to-end to an inner draw-bar section housed in the motor shaft.

However, the Mazak machining center is unable to move the draw-bar outward, opposite the spring bias direction, without axially loading the outer cartridge spindle bearings. This is because the detachable geared connection of the motor shaft to the outer cartridge spindle shaft provides for the transmission of torque loads only. To facilitate easy installation and removal of outer cartridge spindles, there is no provision for axially retaining the outer cartridge spindle relative to the motor shaft and the draw-bar actuator. As a result, the application of axial loads to the bearings whenever a tool is released from the outer cartridge spindle reduces bearing life and reduces the speed at which the spindle can be rotated.

What is needed is a motorized precision spindle that has an interchangeable outer cartridge spindle and a two-piece draw-bar and that can release a tool without applying axial pressure to outer cartridge spindle bearings of the spindle.

BRIEF SUMMARY OF THE INVENTION

A motorized precision spindle apparatus for rotating and automatically exchanging tools is provided that includes an outer cartridge spindle removably and interchangeably supported on a motor cartridge spindle. An outer cartridge spindle shaft is supported for rotation about a spindle axis within an outer cartridge spindle shaft housing on outer cartridge spindle bearings. The bearings are operatively connected between the outer cartridge spindle shaft and the outer-cartridge spindle shaft housing. A spindle motor is supported in the motor cartridge spindle and is drivingly and detachably coupled to the outer cartridge spindle shaft. The apparatus also includes a tool holder supported on the outer cartridge spindle shaft and configured to releasably hold a tool in position for rotation with the outer cartridge spindle shaft about the spindle axis. A draw-bar is coaxially supported through the outer cartridge spindle shaft and the motor cartridge spindle for reciprocal axial motion. The draw-bar is operably connected to the tool holder and is biased in an axial direction that causes the tool holder to grip a tool. A draw-bar actuator is operably connected to the draw-bar and is configured to move the draw-bar in a direction opposite the bias, thereby releasing any tool the holder may be holding. The apparatus also includes an isolation tube that is coaxially supported within the motor cartridge spindle. The isolation tube is connected at an outer end to the outer cartridge spindle shaft and is configured and supported in such a way as to support the outer cartridge spindle shaft against transmitting axial forces to the outer cartridge spindle bearings as the draw-bar is moved axially against the direction of spring bias to open the tool holder. Therefore, a motorized precision spindle apparatus constructed according to the invention can move the draw-bar opposite the spring bias direction without applying axial pressure to the outer cartridge spindle bearings.

According to another aspect of the invention, the apparatus further includes a motor spindle supported for rotation about the spindle axis within the spindle motor. The spindle motor is drivingly and detachably coupled to the motor spindle and detachably connected at an outer end to an inner end of the outer cartridge spindle shaft. The draw-bar is coaxially supported through the motor spindle for reciprocal axial motion, and the isolation tube is coaxially supported within the motor spindle.

According to another aspect of the invention, the isolation tube is coupled at its inner end to a structure that is supported against axial motion relative to the cartridge spindle housing.

According to another aspect of the invention, the draw-bar is biased axially inward, away from the tool holder, and the draw-bar actuator is configured to move the draw-bar outward to open the tool holder. In addition, the isolation tube is configured and supported in such a way as to support the outer cartridge spindle shaft against transmitting axial outward forces to the outer cartridge spindle bearings.

According to another aspect of the invention, the draw-bar includes an inner draw-bar section of the draw-bar that is housed in the motor spindle and is drivingly engageable, end-to-end, with an outer draw-bar section housed in the outer cartridge spindle shaft.

According to another aspect of the invention, the draw-bar actuator includes a hydraulic cylinder supported axially and inwardly adjacent the spindle motor and configured to move the draw-bar axially outward against the bias.

According to another aspect of the invention, the apparatus includes a pull coupling that separably interconnects the outer cartridge spindle shaft and the isolation tube. The pull coupling is configured to allow coupling and uncoupling of the outer cartridge spindle shaft and the isolation tube without requiring access to a side or an inner end of the apparatus.

According to another aspect of the invention, the pull coupling includes an annular array of radially flexible isolation tube fingers that extend axially outward from around an axially outer end of the isolation tube. A cylindrical spindle shaft sleeve is supported in an axially inner end of the outer cartridge spindle shaft for axial reciprocal movement between a retracted and an engaged position. The isolation tube fingers include radially outwardly extending isolation tube detents adjacent their distal ends. The spindle shaft includes a spindle shaft detent that extends radially inward from around an inner circumference of an inner end of the spindle shaft. The sleeve is configured to move the isolation tube fingers radially outward carrying the isolation tube detents into engagement with the spindle shaft detent when the sleeve is moved into its engaged position. A cylindrical joint collar surrounds and supports abutting ends of the inner and outer draw-bar sections in coaxial alignment and supports the spindle shaft sleeve against radially inward deflection. This allows an operator to form a rigid pull coupling between the isolation tube to the outer cartridge spindle shaft by abutting the isolation tube and the outer cartridge spindle shaft and sliding the spindle shaft sleeve to its engaged position. When an outer cartridge spindle is to be exchanged, an operator can uncouple the isolation tube and the outer cartridge spindle shaft by moving the spindle shaft sleeve to its retracted position.

According to another aspect of the invention, the spindle shaft sleeve is biased to the engaged position to prevent the sleeve from moving out of the engaged position during spindle operation.

According to another aspect of the invention, the pull coupling includes a hydraulic lock actuator configured to move the spindle shaft sleeve to the engaged position when a source of hydraulic fluid is connected to a hydraulic oil channel of the hydraulic lock actuator. The hydraulic oil channel has an inlet end disposed in the outer cartridge spindle to allow an operator to firmly couple the inner and outer draw-bar sections for operation of the apparatus without requiring access to the sides or axial inner end of the apparatus.

According to another aspect of the invention, the inlet end of the hydraulic oil channel of the hydraulic lock actuator is disposed in an axial outer end of the outer cartridge spindle shaft.

According to another aspect of the invention, the pull coupling includes a hydraulic unlock actuator configured to move the spindle shaft sleeve out of the engaged position when a source of hydraulic fluid is connected to a hydraulic oil channel of the hydraulic unlock actuator. The hydraulic oil channel has an inlet end disposed in the outer cartridge spindle to allow an operator to uncouple the inner and outer draw-bar sections for removal and exchange of the outer cartridge spindle without requiring access to the sides or axial inner end of the apparatus.

According to another aspect of the invention, the inlet end of the hydraulic oil channel of the hydraulic unlock actuator is disposed in an axial outer end of the outer cartridge spindle shaft.

According to another aspect of the invention, the apparatus includes a torque coupling that separably interconnects the outer cartridge spindle shaft and the motor shaft and is configured to limit backlash.

According to another aspect of the invention, the torque coupling comprises an external gear including a plurality of gear teeth extending radially from around an outer circumference of either the inner end of the outer cartridge spindle shaft or the outer end of the motor shaft. An internal gear includes a plurality of gear teeth extending radially inward from around an inner circumference of the other of the inner end of the outer cartridge spindle shaft and the outer end of the motor shaft. The external gear teeth are in meshing engagement with the internal gear teeth when the outer cartridge spindle shaft is connected to the motor shaft.

According to another aspect of the invention, the external gear teeth extend radially outward from around the outer circumference of the outer end of the motor shaft and the internal gear teeth extend radially inward from around the inner circumference of the inner end of the outer cartridge spindle shaft.

According to another aspect of the invention, the external gear teeth have the same pitch diameter and profile shift as the internal gear teeth.

According to another aspect of the invention, the torque coupling includes a plunger supported coaxially within the outer cartridge spindle shaft for axial reciprocal motion between released and engaged positions. The plunger includes an outer circumferential tapered frusto-conical surface that engages a mating surface on a side of the internal gear and is configured to radially expand a pitch diameter of the internal gear when the plunger is advanced axially toward the internal gear.

According to another aspect of the invention, the torque coupling is biased to the released position and is hydraulically driven to the engaged position.

According to another aspect of the invention, the torque coupling includes a safety collar supported coaxially around the outer cartridge spindle shaft for axial reciprocal motion between released and engaged positions. The safety collar includes an inner circumferential tapered frusto-conical surface that, in the engaged position, engages and applies radially inward pressure on an outer circumferential surface of the outer cartridge spindle shaft adjacent the internal gear to further secure the meshing of the internal gear teeth of the outer cartridge spindle shaft with the external gear teeth of the motor shaft. This arrangement helps to compensate for any remaining backlash and, especially with high-speed applications, ensures that centrifugal forces will not affect gear meshing.

BRIEF DESCRIPTION OF THE SEVERAL VIEWS OF THE DRAWINGS

These and other features and advantages of the invention will become apparent to those skilled in the art in connection with the following detailed description and drawings, in which.

DETAILED DESCRIPTION OF INVENTION EMBODIMENT(S)

A motorized precision spindle apparatus 10 for rotating and exchanging tools in a flexible machining operation is generally shown in the drawings. As shown in FIGS. 1-5, the apparatus 10 includes an outer cartridge spindle 12 removably and interchangeably supported on a motor cartridge spindle 14. The outer cartridge spindle 12 includes an outer cartridge spindle shaft 16 supported for rotation about a spindle axis 18 with a coaxial outer cartridge spindle shaft housing 20 on outer cartridge spindle bearings 22. The outer cartridge spindle bearings 22 are operatively connected between the outer cartridge spindle shaft 16 and the outer cartridge spindle shaft housing 20. A spindle motor 24 is supported in the motor cartridge spindle 14 and is drivingly and detachably coupled to the outer cartridge spindle shaft 16.

Figure 1:
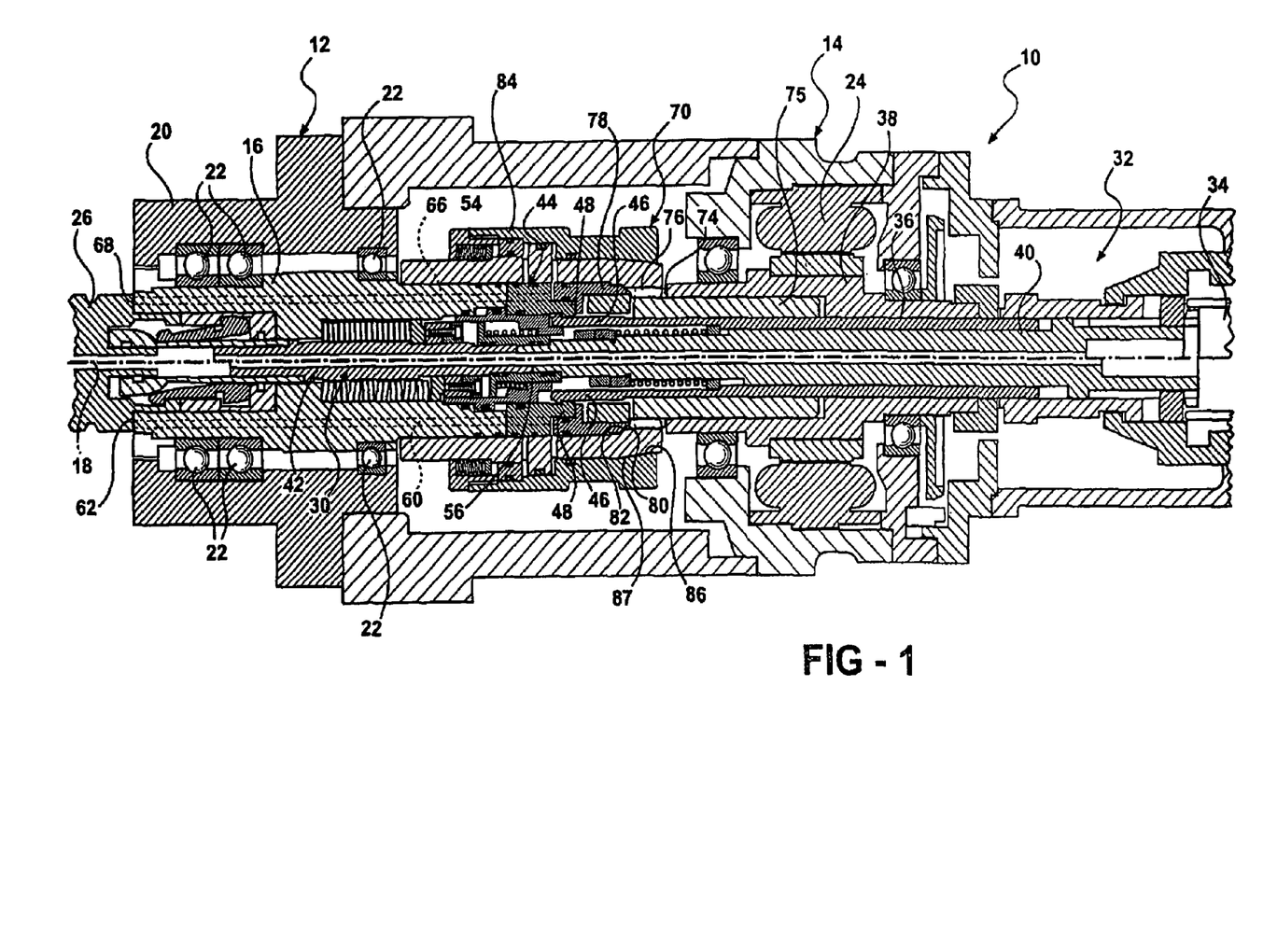
FIG. 1 is a cross-sectional side view of a precision motorized spindle assembly constructed according to the invention and with torque coupling, pull coupling, draw-bar, outer cartridge spindle, motor shaft and draw-bar actuator elements drawn with darkened lines for emphasis.
Figure 2:
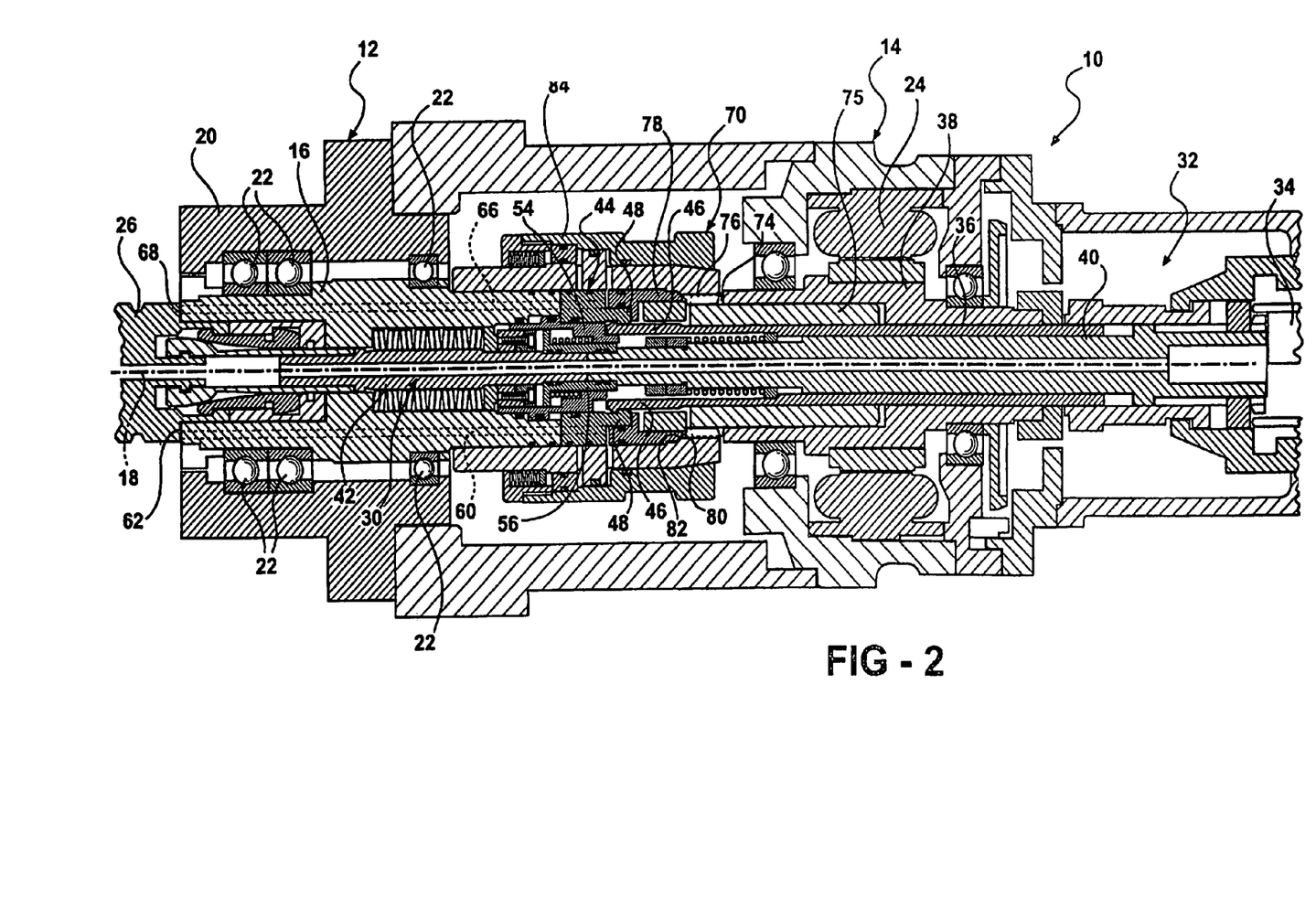
FIG. 2 is a cross-sectional side view of the precision motorized spindle assembly of FIG. 1 but with the torque coupling drawn with lightened lines to emphasize the adjacent pull coupling.
Figure 4:
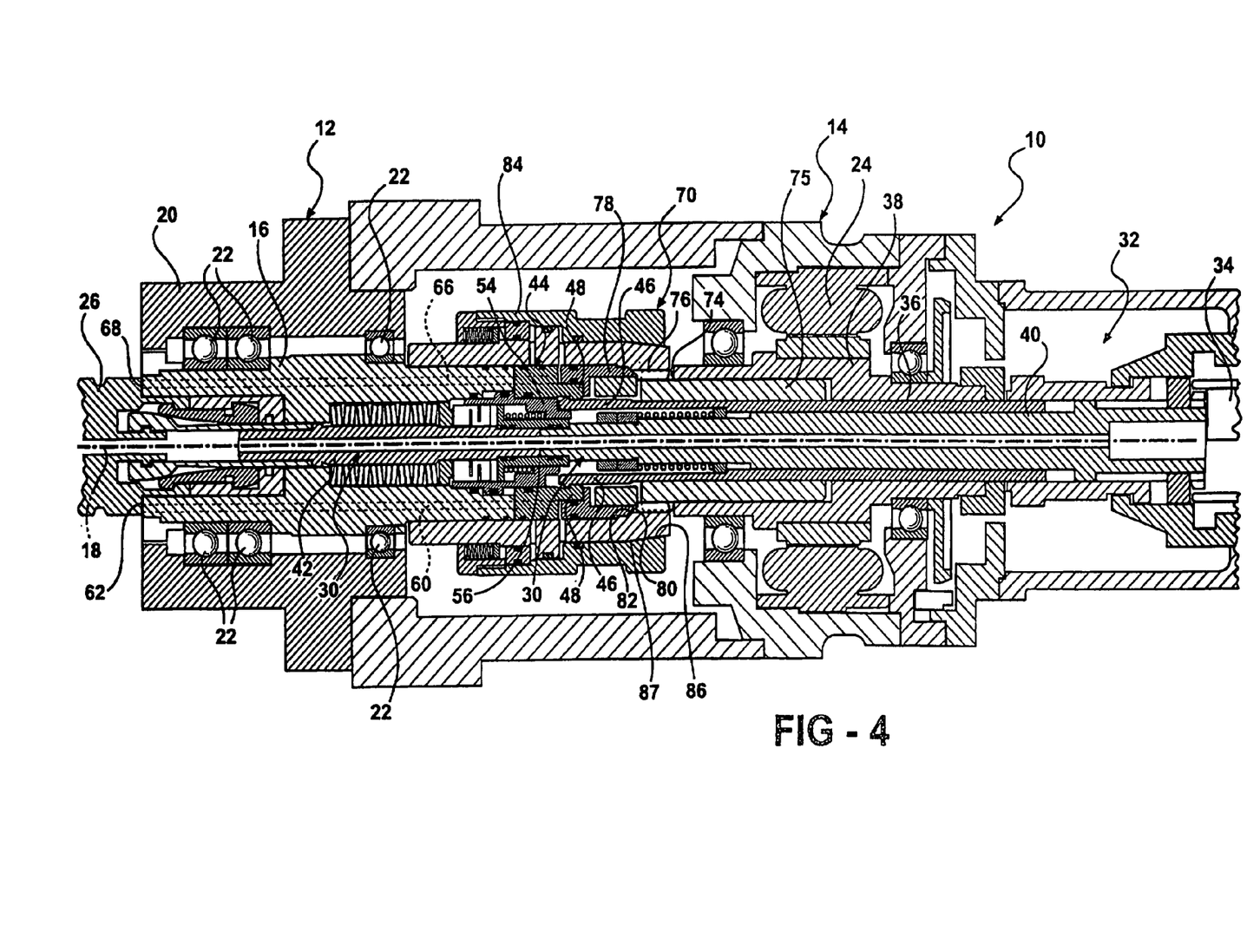
FIG. 4 is a cross-section side view of the precision motorized spindle assembly of FIG. 1 but with the draw-bar, draw-bar actuator, and pull coupling shown with lightened lines to emphasize the adjacent torque coupling.

As shown in FIGS. 1, 2, and 4, the apparatus 10 also includes a tool holder 26 supported in an outer end of the outer cartridge spindle shaft 16. The tool holder 26 releasably holds a tool in position for rotation with the outer cartridge spindle shaft 16 about the spindle axis 18.

A draw-bar, shown at 30 in FIGS. 1-5, is coaxially supported through the outer cartridge spindle shaft 16 and the motor cartridge spindle 14 for reciprocal axial motion. An outer end of the draw-bar 30 is operably connected to the tool holder 26 and the draw-bar 30 is spring biased in an axially inward direction away from the tool holder 26. The bias causes the tool holder 26 to grip a tool 28.

A draw-bar actuator, shown at 32 in FIGS. 1, 2, and 4, is operably connected to an inner end of the draw-bar 30 and moves the draw-bar 30 in an axially outward direction opposite the bias, thereby releasing any tool the tool holder 26 may be holding. The draw-bar actuator 32 includes a hydraulic cylinder 34 that is supported axially and inwardly adjacent the spindle motor 24. The hydraulic cylinder 34 provides the force necessary to move the draw-bar 30 axially outward against the spring bias.

The apparatus 10 also includes an isolation tube shown at 36 in FIGS. 1-5. The isolation tube 36 is coaxially supported within the motor cartridge spindle 14. The isolation tube 36 is rigidly connected at an axial outer end to an axial inner end of the outer cartridge spindle shaft 16. The isolation tube 36 axially supports the outer cartridge spindle shaft 16 in such a way as to prevent the outer cartridge spindle shaft 16 from transmitting axial forces to the outer cartridge spindle bearings 22 as the draw-bar 30 is moved axially outward against the direction of spring bias to open the tool holder 26. In other words, the isolation tube 36 is supported in such a way as to support the outer cartridge spindle shaft 16 against transmitting force axially outward to the outer cartridge spindle bearings 22.

The apparatus 10 further includes a motor spindle shown at 38 in FIGS. 1-5. The motor spindle 38 is supported for rotation about the spindle axis 18 within the spindle motor 24 in the motor cartridge spindle 14. The spindle motor 24 is drivingly and detachably coupled to the motor spindle 38 and the motor spindle 38 is detachably connected at an outer end to an inner end of the outer cartridge spindle shaft 16. The draw-bar 30 is coaxially supported through the motor spindle 38 for reciprocal axial motion. The isolation tube 36 is coaxially supported between the motor spindle 38 and the draw-bar 30. The isolation tube 36 is rigidly coupled at its inner end to a structure that supports the isolation tube 36 against axial motion relative to the cartridge spindle shaft housing 20.

The draw-bar 30 includes an axially inner draw-bar section 40 that is housed in the motor spindle 38. The inner draw-bar section 40 is drivingly engageable, end to end, with an axially outer draw-bar section 42 housed in the outer cartridge spindle shaft 16.

The apparatus 10 also includes a pull coupling, shown at 44 in FIGS. 1-5, which separably interconnects the outer cartridge spindle shaft 16 and the isolation tube 36. The pull coupling 44 allows coupling and uncoupling of the outer cartridge spindle shaft 16 and the isolation tube 36 without requiring access to a side of the apparatus 10 adjacent the coupling or to an axially inner or back end of the apparatus 10 adjacent the spindle motor 24 and draw-bar actuator 32.

Figure 3:
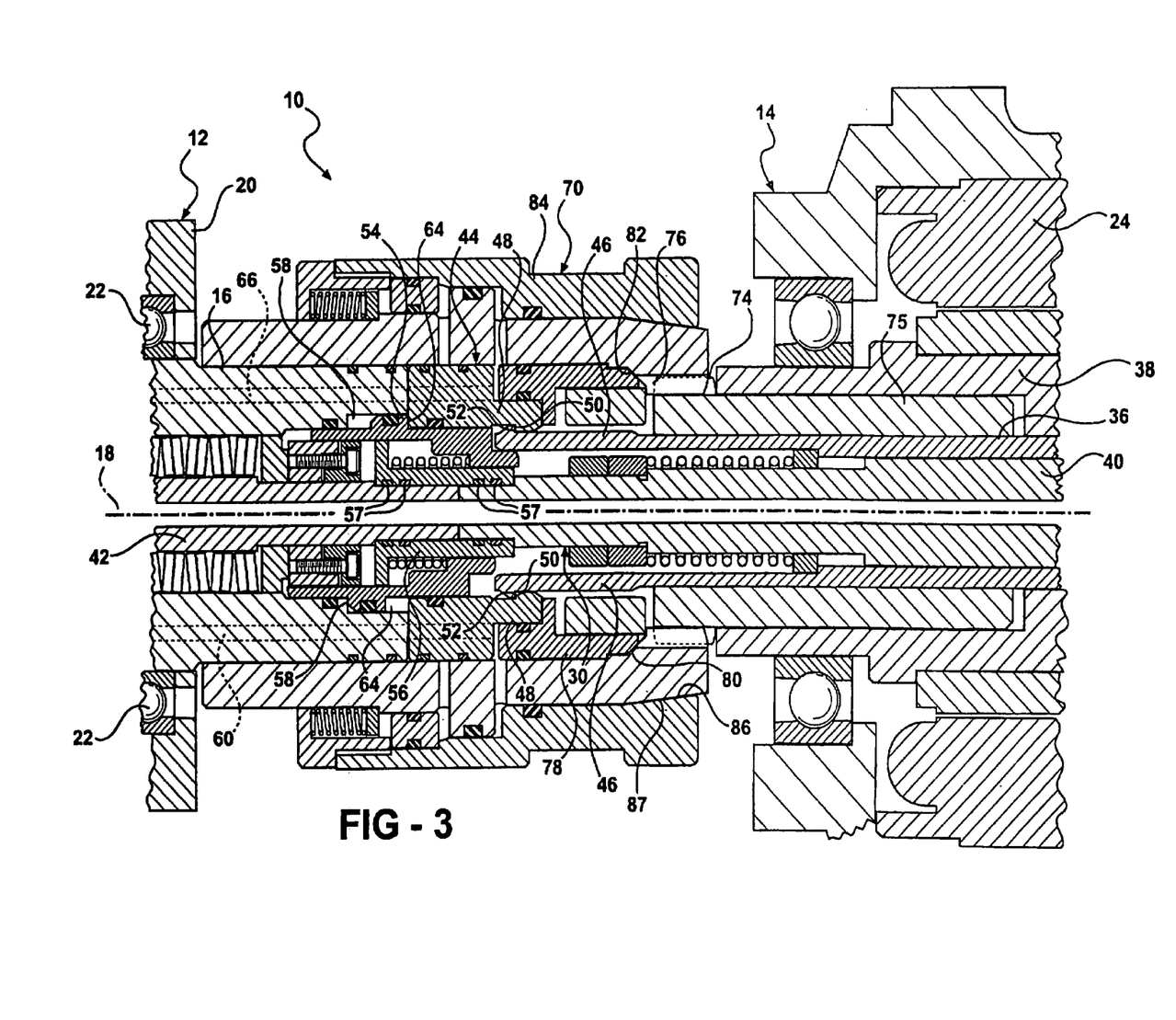
FIG. 3 is a magnified view of a portion of the spindle assembly of FIG. 1 including the torque coupling and pull coupling but with the torque coupling shown with lightened lines to emphasize the pull coupling.

The pull coupling 44 includes an annular array of radially flexible isolation tube fingers shown at 46 in FIGS. 1-5. The isolation tube fingers 46 extend axially outward from around an axial outer end of the isolation tube 36. The pull coupling 44 also includes an annular array of spindle shaft fingers shown at 48 in FIGS. 1-5. The spindle shaft fingers 48 extend axially inward from around an axial inner end of the spindle shaft 16. As best shown in FIG. 3, the isolation tube fingers 46 include radially outwardly extending isolation tube detents 50 adjacent their distal ends. As is also best shown in FIG. 3, the spindle shaft fingers 48 include radially inwardly extending spindle shaft detents 52 disposed adjacent their distal ends.

A spindle shaft sleeve, shown at 54 in FIGS. 1-5, is supported in an axially inner end of the outer cartridge spindle shaft 16 for axial reciprocal movement between a retracted and an engaged position. When moved to its engaged position the spindle shaft sleeve 54 engages and moves the isolation tube fingers 46 radially outward, carrying the isolation tube detents 50 into engagement with the spindle shaft detents 52. Engagement of the isolation tube detents 50 with the spindle shaft detents 52 locks the isolation tube 36 and the outer cartridge spindle shaft 16 against being pulled axially away from one another. The spindle shaft sleeve 54 is spring biased to the engaged position to prevent the spindle shaft sleeve 54 from moving out of the engaged position during spindle apparatus operation.

A cylindrical joint collar, shown at 56 in FIGS. 1-5, surrounds and supports abutting ends of the inner and outer draw-bar sections 40, 42 in coaxial alignment. Because coolant fluid is introduced into the hollow core of the draw bar 40, 42, the joint collar 56 also includes four ring seals as is best shown at 57 in FIG. 3. The ring seals 57 prevent coolant fluid from escaping the draw bar 40, 42 where the inner draw-bar section 40 abuts the outer draw-bar section 42.

An operator can therefore form a rigid pull coupling 44 between the isolation tube 36 and the outer cartridge spindle shaft 16 by abutting the isolation tube 36 and the outer cartridge spindle shaft 16 and sliding the spindle shaft sleeve 54 to its engaged position. To remove an outer cartridge spindle 12 from the apparatus 10, an operator can release the outer cartridge spindle shaft 16 from the isolation tube 36 by moving the spindle shaft sleeve 54 to its retracted position.

The pull coupling 44 includes a hydraulic lock actuator best shown at 58 in FIG. 3. The hydraulic lock actuator 58 moves the spindle shaft sleeve 54 to the engaged position, rigidly coupling the isolation tube 36 to the outer cartridge spindle shaft 16. The hydraulic lock actuator 58 moves the spindle shaft sleeve 54 to the engaged position when a source of hydraulic fluid is connected to a hydraulic lock oil channel 60 of the hydraulic lock actuator 58. As shown in FIGS. 1, 2, and 4, the hydraulic lock oil channel 60 has a lock channel inlet end 62 disposed at an axial outer end of the outer cartridge spindle 12 to allow an operator to firmly couple the inner and outer draw-bar sections 40, 42 for operation of the apparatus 10 without requiring access to the sides or axial inner end of the apparatus 10.

The pull coupling 44 also includes a hydraulic unlock actuator best shown at 64 in FIG. 3. The hydraulic unlock actuator 64 moves the spindle shaft sleeve 54 out of the engaged position to uncouple the isolation tube 36 in the outer cartridge spindle shaft 16. The hydraulic unlock actuator 64 moves the spindle shaft sleeve 54 out of the engaged position when a source of hydraulic fluid is connected to a hydraulic unlock oil channel 66 of the hydraulic unlock actuator 64. As shown in FIGS. 2 and 4, the hydraulic unlock oil channel 66 has an unlock channel inlet end 68 disposed at an axial outer end of the outer cartridge spindle 12 to allow an operator to uncouple the inner and outer draw-bar sections 40, 42 for removal and exchange of the outer cartridge spindle 12 without requiring access to the sides or axial inner end of the apparatus 10.

Figure 5:
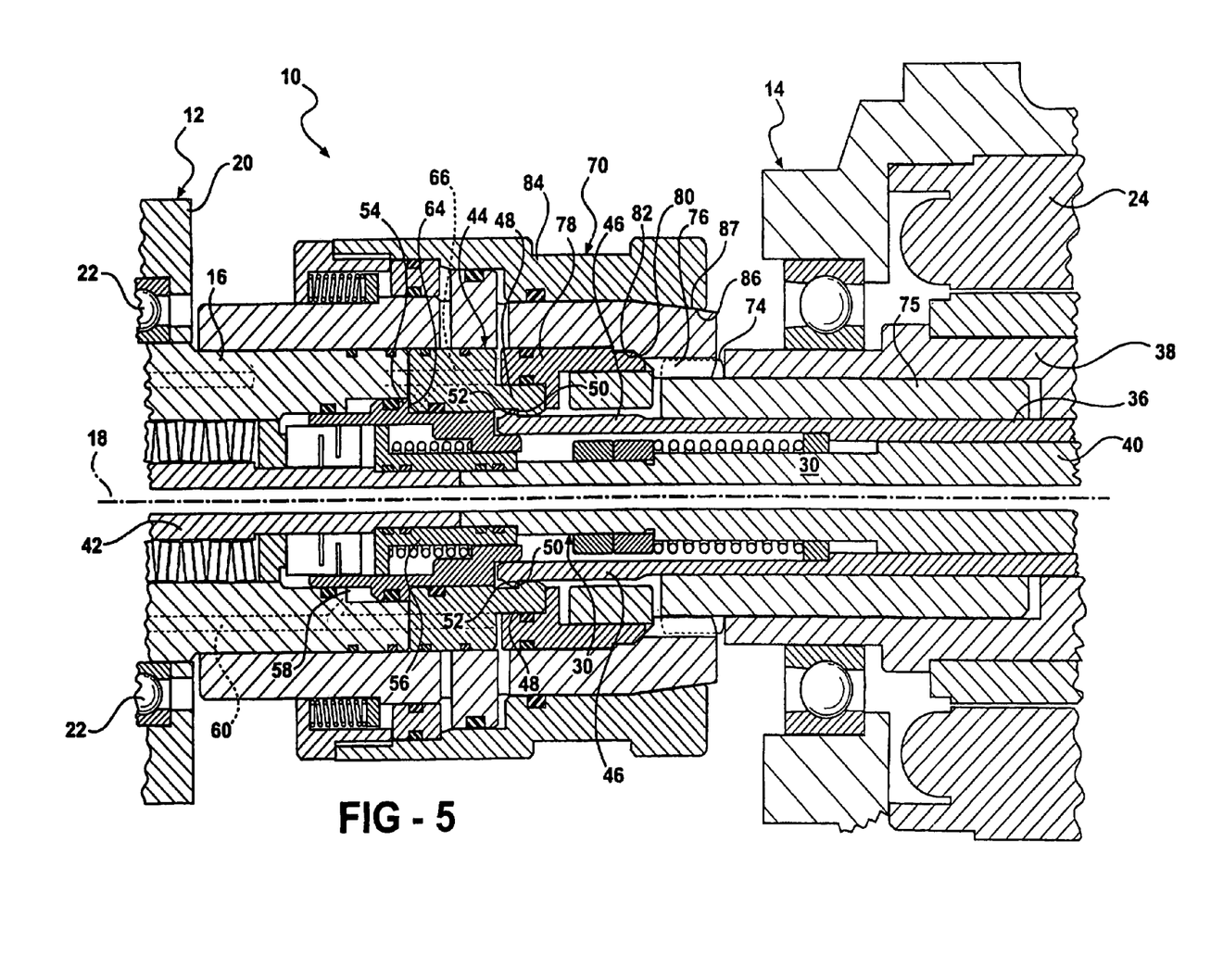
FIG. 5 is a magnified view of a portion of the precision motorized spindle assembly of FIG. 1 including the torque coupling and pull coupling but with the draw-bar and pull coupling shown with lightened lines to emphasize the torque coupling.

The apparatus 10 includes a torque coupling best shown at 70 in FIG. 5. The torque coupling 70 separably interconnects the motor spindle 38 to the outer cartridge spindle shaft 16 in such a way as to allow torque transmission from the motor spindle 38 to the outer cartridge spindle shaft 16. The torque coupling 70 is also designed to limit or prevent backlash. The torque coupling 70 comprises an external gear 74 including a plurality of gear teeth extending radially outward from around an outer circumference of the axial outer end of a cylinder 75 that is coaxially fixed within the motor spindle 38 against rotation relative to the motor spindle 38. The torque coupling 70 also comprises an internal gear 76 that includes a plurality of gear teeth extending radially inward from around an inner circumference of the axial inner end of the outer cartridge spindle shaft 16. The teeth of the external gear 74 are in meshing engagement with the teeth of the internal gear 76 when the outer cartridge spindle shaft 16 is connected to the motor spindle 38. The teeth of the external gear 74 have the same pitch diameter and profile shift as the teeth of the internal gear 76.

The torque coupling 70 also includes a plunger best shown at 78 in FIG. 5. The plunger 78 is supported coaxially within the outer cartridge spindle shaft 16 for axial reciprocal motion between released and engaged positions. The plunger 78 includes an outer circumferential tapered frusto-conical surface 80 that engages a mating surface 82 on a side of the internal gear 76. The plunger 78 radially expands a pitch diameter of the internal gear 76 when the plunger 78 is advanced axially toward the internal gear 76. The plunger 78 is spring biased to the released position and is hydraulically driven to the engaged position.

The torque coupling 70 includes a safety collar shown at 84 in FIGS. 1-5. The safety collar 84 is supported coaxially around the outer cartridge spindle shaft 16 for axial reciprocal motion between released and engaged positions. As is best shown in FIG. 5, the safety collar 84 includes an inner circumferential tapered frusto-conical surface 86 that, in the engaged position, engages and applies radially inward pressure on an outer circumferential tapered frusto-conical surface 87 of the outer cartridge spindle shaft 16 adjacent the internal gear 76. This further secures the meshing of the internal gear teeth of the outer cartridge spindle shaft 16 with the external gear teeth of the motor spindle 38. The safety collar 84 compensates for any remaining backlash and, especially in high speed applications, insures that centrifugal forces will not affect the meshing of the gears.

This description is intended to illustrate certain embodiments of the invention rather than to limit the invention. Therefore, it uses descriptive rather than limiting words. Obviously, it's possible to modify this invention from what the description teaches. One may practice the invention other than as described.

What is claimed is:

1. A motorized precision spindle apparatus (10) for rotating and exchanging tools in a flexible machining operation, the apparatus (10) comprising:

an outer cartridge spindle (12) removably and interchangeably supported on a motor cartridge spindle (14) and including an outer cartridge spindle shaft (16) supported for rotation about a spindle axis (18) within an outer cartridge spindle shaft housing (20) on outer cartridge spindle bearings (22) operatively connected between the outer cartridge spindle shaft (16) and the outer cartridge spindle shaft housing (20);

a spindle motor (24) supported in the motor cartridge spindle (14) and drivingly and detachably coupled to the outer cartridge spindle shaft (16);

a tool holder (26) supported on the outer cartridge spindle shaft (16) and configured to releasably hold a tool in position for rotation with the outer cartridge spindle shaft (16) about the spindle axis (18);

a draw-bar (30) coaxially supported though the outer cartridge spindle shaft (16) and the motor cartridge spindle (14) for reciprocal axial motion, the draw-bar (30) being operably connected to the tool holder (26) and biased in an axial direction that causes the tool holder (26) to grip a tool;

a draw-bar actuator (32) operably connected to the draw-bar (30) and configured to move the draw-bar (30) in a direction opposite the bias, thereby releasing any tool the holder may be holding; and an isolation tube (36) coaxially supported within the motor cartridge spindle (14), connected at an outer end to the outer cartridge spindle shaft (16) and configured and supported so as to support the outer cartridge spindle shaft (16) against transmitting axial forces to the outer cartridge spindle bearings (22) as the draw-bar (30) is moved axially against the direction of bias to open the tool holder (26) the apparatus (10) includes a pull coupling (44) that separably interconnects the outer cartridge spindle shaft (16) and the isolation tube (36) and is configured to allow coupling and uncoupling of the outer cartridge spindle shaft (16) and the isolation tube (36) without requiring access to a side or an inner end of the apparatus (10);

the pull coupling (44) including an annular array of radially flexible isolation tube fingers (46) that extend axially outward from around an axially outer end of the isolation tube (36);

a cylindrical spindle shaft sleeve (54) being supported in an axially inner end of the outer cartridge spindle shaft (16) for axial reciprocal movement between a retracted and an engaged position;

the isolation tube fingers (46) including radially outwardly extending isolation tube detents (50) adjacent the distal ends of the isolation tube fingers (46);

the spindle shaft including a spindle shaft detent that extends radially inward from around an inner circumference of the spindle shaft;

the spindle shaft sleeve (54) being configured to engage and move the isolation tube fingers (46) radially outward carrying the isolation tube detents (50) into engagement with the spindle shaft detent when the sleeve is moved into its engaged position; and a cylindrical joint collar (56) surrounding and supporting abutting ends of the inner and outer draw-bar sections (40, 42) in coaxial alignment.

2. A motorized precision spindle apparatus (10) as defined in claim 1 in which:

the apparatus 10 further includes a motor spindle (38) supported for rotation about the spindle axis (18) within the spindle motor (24), the spindle motor (24) being drivingly and detachably coupled to the motor spindle (38) and detachably connected at an outer end to an inner end of the outer cartridge spindle shaft (16);

the draw-bar (30) is coaxially supported through the motor spindle (38) for reciprocal axial motion; and the isolation tube (36) is coaxially supported within the motor spindle (38).

3. A motorized precision spindle apparatus (10) as defined in claim 1 in which the isolation tube (36) is coupled at its inner end to a structure that is supported against axial motion relative to the cartridge spindle housing.

4. A motorized precision spindle apparatus (10) as defined in claim 1 in which:

the draw-bar (30) is biased axially inward, away from the tool holder (26), the draw-bar actuator (32) is configured to move the draw-bar (30) outward to open the tool holder (26); and the isolation tube (36) is configured and supported in such a way as to support the outer cartridge spindle shaft (16) against transmitting axial outward forces to the outer cartridge spindle bearings (22).

5. A motorized precision spindle apparatus (10) as defined in claim 1 in which the draw-bar (30) includes an inner draw-bar (30) section that is housed in the motor spindle (38) and is drivingly engageable, end-to-end, with an outer draw-bar (30) section housed in the outer cartridge spindle shaft (16).

6. A motorized precision spindle apparatus (10) as defined in claim 1 in which the draw-bar actuator (32) includes a hydraulic cylinder (34) supported axially and inwardly adjacent the spindle motor (24) and configured to move the draw-bar (30) axially outward against the bias.

7. A motorized precision spindle apparatus (10) as defined in claim 1 in which the spindle shaft sleeve (54) is biased to the engaged position.

8. A motorized precision spindle apparatus (10) as defined in claim 1 in which the pull coupling (44) includes a hydraulic lock actuator (58) configured to move the spindle shaft sleeve (54) to the engaged position when a source of hydraulic fluid is connected to a hydraulic lock oil channel (60) of the hydraulic lock actuator (58), the hydraulic lock oil channel (60) having a lock channel inlet end (62) disposed in the outer cartridge spindle (12).

9. A motorized precision spindle apparatus (10) as defined in claim 8 in which the lock channel inlet end (62) is disposed in an axial outer end of the outer cartridge spindle shaft (16).

10. A motorized precision spindle apparatus (10) as defined in claim 1 in which the pull coupling (44) includes a hydraulic unlock actuator (64) configured to move the spindle shaft sleeve (54) out of the engaged position when a source of hydraulic fluid is connected to a hydraulic unlock oil channel (60) of the hydraulic unlock actuator (64), the hydraulic unlock oil channel (60) having an unlock channel inlet end (62) disposed in the outer cartridge spindle (12).

11. A motorized precision spindle apparatus (10) as defined in claim 10 in which the unlock channel inlet end (62) is disposed in an axial outer end of the outer cartridge spindle shaft (16).

12. A motorized precision spindle apparatus (10) as defined in claim 1 in which the apparatus (10) includes a torque coupling (70) that separably interconnects the outer cartridge spindle shaft (16) to a motor spindle (38) of the spindle motor (24) and is configured to limit backlash.

13. A motorized precision spindle apparatus (10) as defined in claim 12 in which the torque coupling (70) comprises an external gear (74) including a plurality of gear teeth extending radially from around an outer circumference of the outer end of the motor spindle (38), and an internal gear (76) including a plurality of gear teeth extending radially inward from around an inner circumference of the inner end of the outer cartridge spindle shaft (16), the external gear teeth being in meshing engagement with the internal gear teeth when the outer cartridge spindle shaft (16) is connected to the motor spindle (38).

14. A motorized precision spindle apparatus (10) as defined in claim 13 in which the external gear teeth have the same pitch diameter and profile shift as the internal gear teeth.

15. A motorized precision spindle apparatus (10) for rotating and exchanging tools in a flexible machining operation, the apparatus (10) comprising:

an outer cartridge spindle (12) removably and interchangeably supported on a motor cartridge spindle (14) and including an outer cartridge spindle shaft (16) supported for rotation about a spindle axis (18) within an outer cartridge spindle shaft housing (20) on outer cartridge spindle bearings (22) operatively connected between the outer cartridge spindle shaft (16) and the outer cartridge spindle shaft housing (20);

a spindle motor (24) supported in the motor cartridge spindle (14) and drivingly and detachably coupled to the outer cartridge spindle shaft (16);

a tool holder (26) supported on the outer cartridge spindle shaft (16) and configured to releasably hold a tool in position for rotation with the outer cartridge spindle shaft (16) about the spindle axis (18);

a draw-bar (30) coaxially supported through the outer cartridge spindle shaft (16) and the motor cartridge spindle (14) for reciprocal axial motion, the draw-bar (30) being operably connected to the tool holder (26) and biased in an axial direction that causes the tool holder (26) to grip a tool;

a draw-bar actuator (32) operably connected to the draw-bar (30) and configured to move the draw-bar (30) in a direction opposite the bias, thereby releasing any tool the holder may be holding;

an isolation tube (36) coaxially supported within the motor cartridge spindle (14), connected at an outer end to the outer cartridge spindle shaft (16) and configured and supported so as to support the outer cartridge spindle shaft (16) against transmitting axial forces to the outer cartridge spindle bearings (22) as the draw-bar (30) is moved axially against the direction of bias to open the tool holder (26);

a torque coupling (70) that separably interconnects the outer cartridge spindle shaft (16) to a motor spindle (38) of the spindle motor (24) and is configured to limit backlash; and the torque coupling (70) including a plunger (78) supported coaxially within the outer cartridge spindle shaft (16) for axial reciprocal motion between released and engaged positions, the plunger (78) including an outer circumferential tapered frusto-conical surface (80) that engages a mating surface (82) on a side of the internal gear (76) and is configured to radially expand a pitch diameter of the internal gear (76) when the plunger (78) is advanced axially toward the internal gear (76).

16. A motorized precision spindle apparatus (10) as defined in claim 15 in which the torque coupling (70) is biased to the released position and is hydraulically driven to the engaged position.

17. A motorized precision spindle apparatus (10) as defined in claim 15 in which the torque coupling (70) includes a safety collar (84) supported coaxially around the outer cartridge spindle shaft (16) for axial reciprocal motion between released and engaged positions, the safety collar (84) including an inner circumferential tapered frusto-conical surface (86) that, in the engaged position, engages and applies radially inward pressure on an outer circumferential tapered frusto-conical surface (87) of the outer cartridge spindle shaft (16) adjacent the internal gear (76).

\* \* \* \* \*